Nov. 19, 1935.   C. V. BOYS   2,021,142
APPARATUS FOR DELIVERING MEASURED AMOUNTS OF LIQUID
Filed July 16, 1934

Charles Vernon Boys, INVENTOR
BY Thanks Appleman, ATTORNEY

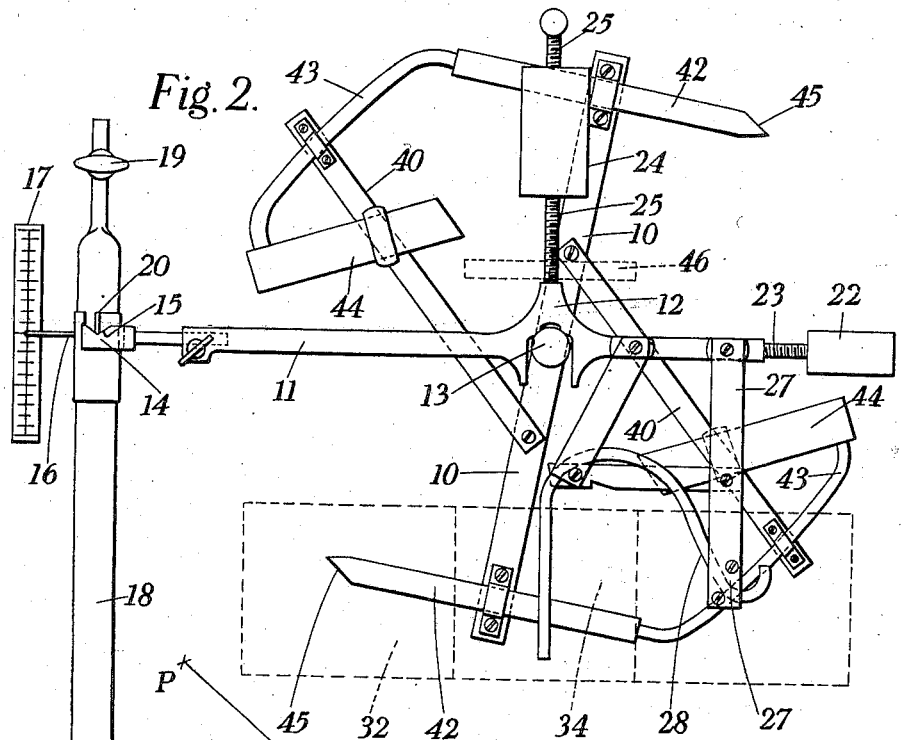
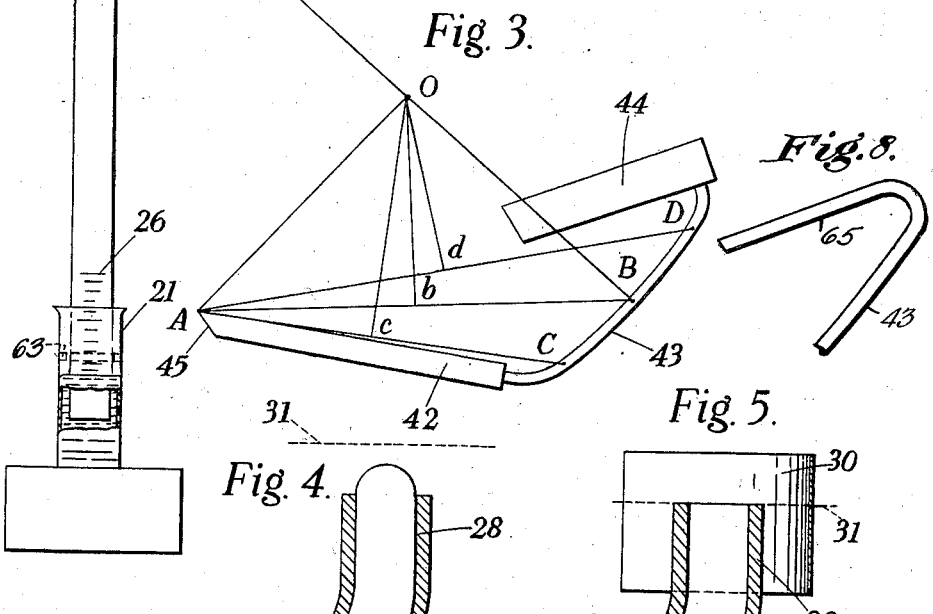

Patented Nov. 19, 1935

2,021,142

UNITED STATES PATENT OFFICE 2,021,142

APPARATUS FOR DELIVERING MEASURED AMOUNTS OF LIQUID

Charles Vernon Boys, London, England

Application July 16, 1934, Serial No. 735,502
In Great Britain January 24, 1934

14 Claims. (Cl. 221—97)

The invention relates to apparatus for measuring and doling out a liquid from a reservoir and primarily it may be applied to the doling out of water for use in a recording or non-recording calorimeter but the invention is not limited to that particular purpose. In particular the invention utilizes liquid delivery apparatus of the kind consisting of a rotated carrier on which one or more dipping and delivery receptacles is mounted.

The invention aims at providing a mechanism which will dole out and deliver water accurately at a given rate and at a rate which may be made to depend upon the water level in the reservoir from which the water is doled. In the application to a gas calorimeter, the invention aims at enabling the rate of flow of water to vary inversely as the volume occupied by a gas at the temperature and pressure at which a calorimeter measurement is carried out. The invention, however, may be equally well employed in delivering water or other liquid at any desired constant rate within limits as may be convenient in applying the invention for supplying water to a non-recording gas calorimeter.

One object of the invention consists in an apparatus including a rotary carrier having a measuring receptacle mounted thereon, a reservoir for liquid, and means for controlling the level of liquid in the reservoir so that the level is caused to vary in accordance with a predetermined factor, the arrangement being such that the receptacle is operative to pick up at each revolution an amount of liquid which depends accurately on the amount of liquid in the reservoir, retain that liquid during further movement and ultimately discharge it. In the case of a gas calorimeter, the level is required to follow the gas volume factor of the moment. In such a case, it is necessary to cause the level of water in the reservoir to vary in accordance with an inverse or reciprocal law. The device used for this purpose consists of a balance arm carrying a siphon so that the position of the upturned delivery mouth of the siphon is made to depend upon the law in question, which in the case of a gas calorimeter, is the reciprocal law with respect to the gas volume factor. The necessary level of the delivery mouth of the siphon may in this case be obtained by actuating the balance arm by suspending from it a long gas bell enclosing a volume of gas over mercury. The necessary conditions and the method of designing the parts to attain this particular result will be set out in greater detail hereinafter.

Another object of the invention consists in an apparatus including a tubular receptacle formed with an opening at each end, means for causing the receptacle to rotate about a horizontal axis and a reservoir so arranged that, as the receptacle rotates, it dips into the reservoir and picks up liquid through one of the openings and then upon further rotation raises that liquid above the reservoir and then discharges it through the other opening.

Yet another object of the invention consists in an apparatus including a receptacle and means for rotating the receptacle about a substantially horizontal axis, the receptacle comprising a main container and an adjusting tube in communication with the main container, and the arrangement being such that the receptacle can, during rotation, dip into a reservoir so as to pick up a quantity of liquid therefrom which depends upon the liquid level in the reservoir. The main container determines the main part of each amount of liquid picked up while the adjusting tube serves to adjust the exact amount of liquid picked up in accordance with the amount of liquid in the reservoir.

Yet another object of the invention consists in an apparatus including a rotatable carrier, a receptacle mounted on the carrier, a reservoir for liquid and means for automatically varying the level of liquid in the reservoir in accordance with the gas volume factor at the moment, the arrangement being such that the amount of liquid picked up by the receptacle varies with the liquid level in the reservoir and inversely with the gas volume factor at the moment.

More particularly defined, the invention consists in an apparatus for doling measured quantities of liquid, comprising in combination at least one measuring receptacle, means including driving means for causing said receptacle to revolve round a horizontal axis, a receiver for liquid located above said axis and a receiver for liquid located below said axis, said receptacle being operative to pick up at each revolution an amount of liquid which depends accurately on the liquid level in said reservoir, retain that liquid during further movement and deliver it to said receiver.

The invention further comprises the elements and combinations of parts set forth in the annexed claims.

In order that the invention may be clearly understood and readily carried into effect, a form of construction of the new apparatus as applied to the delivery of cooling water to a gas calorimeter will now be described by way of example with reference to the accompanying drawings, in which:—

Figure 2 is a front elevation corresponding to Figure 1 showing the water measuring wheel, balance arm, air bell and siphon only;

Figure 3 is a diagram illustrating the geometrical construction of the components of the measuring wheel;

Figures 4 and 5 are enlarged elevations showing the delivery mouth of the siphon and illustrating effects of capillarity;

Figure 8 shows a further modification of the construction shown in Figures 1 and 2.

Figures 1, 7:
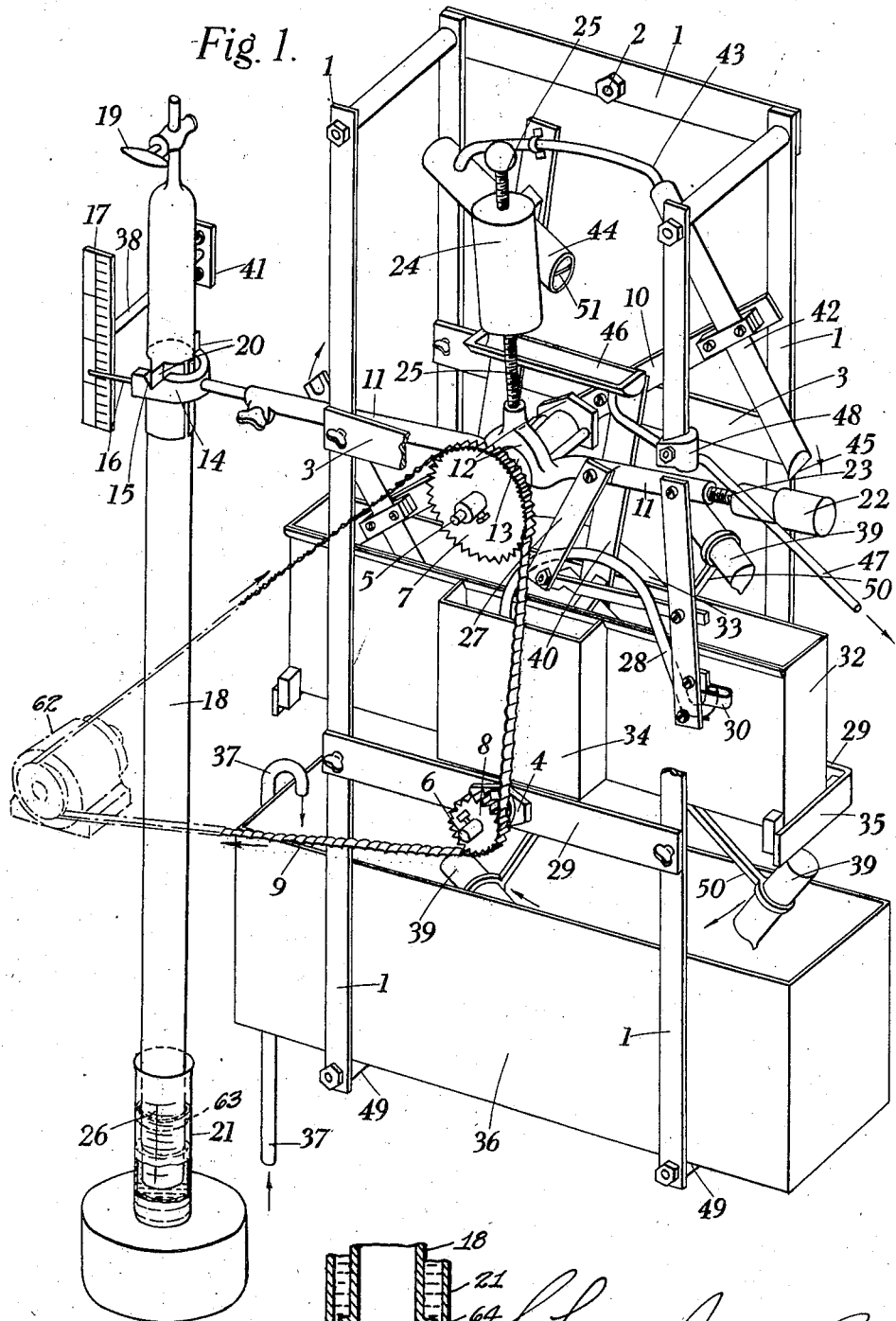
Figure 1 is a perspective view of the apparatus with a few parts broken away to illustrate the invention more clearly.
Figure 7 shows a modification of a detail of the construction shown in Figures 1 and 2.

Referring particularly to Figures 1 and 2, the essential parts of the apparatus consist of a water measuring wheel indicated generally at 10 and rotated continuously through a chain 9 and sprocket wheel 7 from a motor 62, but which may conveniently be a synchronous alternating current motor, such as are now used for driving clocks from alternating current mains or other similar motors of suitable power. The next main element consists of a balance arm 11 actuated by a long air bell 18 suspended from it and a siphon 28 carried by the balance arm 11 and serving to regulate the water level in a tank 32. Again there is a lifting device consisting of a spider bearing a number of thimbles 39 and rotated by a sprocket wheel 8 also driven from the chain 9 so as to cause the thimbles 39 to dip into water in a reservoir tank 36 and to lift the water and discharge it into the main tank 32 at a rate somewhat in excess of that at which the water is doled out from the tank 32 by the measuring wheel 10.

Coming now more fully to the details of the different parts, the whole apparatus is supported in a framework 1 secured by means of screws 2 to the back wall of the cupboard in which the instrument is operated. The framework may be lowered on to the screws 2 which enter slots in horizontal bars, the screws then being tightened up. As clearly shown in the drawings there are two horizontal bars 3 about two-thirds of the distance from the bottom of the framework, one at the front and one at the back and there are two similar bars 29 about one-third of the distance from the bottom of the frame. Each of these bars carries a ball bearing enclosed in a housing 4 and these bearings carry the shafts 5 and 6 at the two levels. These shafts project in front of the framework and carry respectively chain sprocket wheels 7 and 8 which are driven from the motor 62 by the chain 9.

The water measuring wheel 10 seen in detail in Figure 2, is fixed to the upper shaft 5 which also carries the balance arm 11. The balance arm is mounted by two inverted V-members 12 upon a ball-bearing reel 13 so that the shaft 5 may revolve without disturbing the balance. The reel 13 and the V-members 12 are prevented from moving axially by flanges not shown in the drawings. In this way, the pivot of the balance arm is co-axial with the axis of the water measuring wheel 10. It is a necessary condition in accordance with the mathematical theory of the construction that the pivot of the balance arm should be at the same level as the axis of the water measuring wheel and the most certain way to attain this object is to make the two co-incident.

The water measuring wheel 10 has the function of picking up and delivering at a higher level an amount of water which varies inversely with the gas volume of the moment. The wheel 10 consists of a spider frame 40 which carries two compound buckets in the form illustrated, although more may be provided. Each bucket consists of three members, seen clearly in Figures 2 and 3; they are the main measuring tube 42, the adjusting tube 43 and the delivery pitcher 44. The measuring tube 42 is provided with a flute-like mouth-piece shown at 45 for taking in the water and the exact position of which in relation to that of the adjusting tube 43 is important from the point of view of the mathematical theory of the operation.

Referring now particularly to Figure 3, the measuring tube 42, adjusting tube 43 and pitcher 44 are again shown and the point O represents the axis of rotation, that is, the axis of the shaft 5. The radius OA from the centre of rotation to the mouth of the measuring tube 42 will be referred to as the basic radius. The point B is at the centre of the adjusting tube 43, and OB is equal to OA and the angle between OB and OA is a right angle. The volume contained in the compound tube between the points A and B is equal to the standard quantity of water required for the gas calorimeter when the gas is of its standard volume 1.000 as will be explained below.

The adjusting tube 43 is bent to a curve, such that the centre of curvature is at the point P, the distance OP being equal to the basic radius, while the angle POA is a right angle. Thus, the radius of curvature of the curve of the adjusting tube 43 is double OA. Moreover, the cross-section of the adjusting tube 43 is such that if as a result of a change in gas volume, the siphon 28 causes the water level in the tank 32 to rise to a height such, for example, that when the mouth of the measuring tube 42 has just risen to the surface of the water, the surface of the water intersects the adjusting tube 43 at D, then the volume of water picked up by the measuring tube between B and D is equal to the necessary additional quantity of water by which the standard quantity must be increased to correspond with the change in gas volume. Similarly if the water level falls so that the surface intersects the adjusting tube 43 at B when the mouth of the measuring tube 42 has risen to the surface, then the adjusting tube 43 is only filled up to the point C and the empty volume between C and B in the adjusting tube 43 represents the difference between the standard volume of water and the volume corresponding to the gas volume in question. If lines Ob, Oc and Od be drawn from the centre of the rotation O at right angles to the lines AB, AC and AD, then these perpendiculars represent the distance of the surface of the water, as determined by the mouth of the siphon, from the axis represented by the point O and the differences in the lengths of these perpendiculars represent the variations in depth of the water. It follows from the mathematical theory of the instrument that, if the tube 43 is bent in this way, then the water picked up at all intermediate positions and delivered will be in inverse proportion to the gas volume, provided that the range of variation does not much exceed the useful range of about 7 per cent either way and even with a 10 per cent variation, the error is trifling.

When the gas volume factor falls to about 0.95, the siphon 28 causes the water level in the tank 32 to rise to a height such that the end of the pitcher 44, remote from the point at which the adjusting tube 43 joins the pitcher 44, will dip into the water upon reaching the bottom of the circular path along which it travels. In order to prevent water from entering the pitcher 44 when this occurs, the mouth of the pitcher 44 is partially closed by a semi-circular plate 51 (Figure 1).

The water collected by the tubes 42 and 43 is transferred by the continued rotation of the measuring wheel to the pitcher 44, by which it is elevated and from which it teems out, that is to say, flows out quietly without any splashing, into a trough 46 whence it flows through the tube 47 for delivery to the calorimeter. The tube 47 is secured by a clamp 48 to one of the uprights of the framework 1, thus supporting the trough 46 as well as the tube 47.

The balance arm 11 carries a crutch 14 at its left hand end formed with a pair of V-notches 15 and beyond the crutch it carries a pointer 16 reading over a scale 17 graduated in terms of the gas volume factor and which is fixed, being carried on a stem 38 from a bracket 41 secured to the back wall of the cupboard. A long air bell 18 furnished with a stop cock 19, carries knife edges 20 which rest in the V-notches 15, so that the air bell 18 is suspended from the balance arm 11. The lower end of the air bell 18 is immersed in a mercury vessel 21 resting on the floor of the cupboard. The balance arm also carries at the right hand end a balance weight 22 arranged for its position to be adjustable along a screw 23 to give an exact balance. The balance arm 11 also carries an anti-gravity bob 24 also arranged to be adjustable along a screw support 25. This may be placed so as to counteract the stability due to the siphon 28 and its supports which are also carried by the arm 11 and to counteract mainly the stability caused by the immersion of the lower end of the air bell 18 in the mercury. By suitable adjustment of the positions of the two weights 22 and 24, the balance may be made so perfect that even if the stop cock 19 is opened, the balance arm 11 will remain in any position in which it is placed. If then the arm is so placed that the pointer 16 reads correctly the gas volume factor of the moment on the scale 17 and the stop cock 19 is then closed, the balance arm 11 will thereafter automatically alter its inclination, so that the gas volume factor of the moment is indicated by the pointer 16 on the scale 17. By modifying the apparatus, delivery of water may be effected according to other laws. If, for example, the adjusting tube was bent so as to be concentric with the axis O, then even although the water level in the trough 32 be made to vary in level inversely with the gas volume as described and as indicated on the scale 17, the variation in the amount of water picked up would be in direct proportion to the scale readings of the gas volume but reversed in direction. If for instance the gas volumes were successively 0.9, 1.0, 1.1 the water picked up would be 1.1, 1.0, 0.9, thus differing from the reciprocal amounts actually picked up with the adjusting tube 43 bent to the double radius, i. e. 1.111, 1.0, 0.909.

A second scale 26 graduated identically with the scale 17, but inverted, is attached to the lower end of the air bell 18 and its graduations correspond with the volume of the air bell 18 from its closed end. Thus, as the air bell 18, being carried by the knife edges 20, moves about a smaller radius than the tip of the pointer 16, its graduations must move to a smaller extent in that ratio. On the other hand, when the air bell 18 moves downwards into the mercury, the level of the mercury rises and thus the reading of the mercury level on the lower scale and of the pointer 16 on the upper scale 17 will agree at all positions if the ratio of the radii of motion of the knife edge 20 and the tip of the pointer 16 is equal to the ratio of the areas of the mercury surface when the tube is and is not immersed respectively.

If the water level in the main tank 32 is required to follow inversely the varying volumes of dry or unsaturated gas, the air bell 18 may be filled with ordinary air, but if the water level is required to follow the varying volumes of saturated gas, which differ from those of dry gas, then the same air bell 18 may be used, but it must contain a few drops of water floating on the surface of the mercury.

The balance arm 11 also carries a light framework 27 in which the siphon 28 is clamped, it being cemented when it has been adjusted to the exact position which will be explained below in order to prevent accidental displacement. This exact position actually depends upon the relations of two hyperbolas as has been discovered, and in order to avoid the necessity of complete mathematical treatment, the conditions which must be fulfilled are now specifically set out. First, the distance from the axis of rotation O to the tip of the pointer 16 is exactly half the length of the air column in the bell 18 when the point 16 reads 1.000 on the scale 17. From this it will be seen that the angle of tilt of the balance arm 11 is such that the sine of that angle is double the scale reading. Secondly, the angle at the axis O between the straight lines drawn from the knife edges 20 and from the centre of the upturned mouth of the siphon 28 is 135 degrees. The siphon mouth follows the reciprocal law so accurately over the useful range of readings on the scale 17, which lie between 0.93 and 1.07, that no error resulting from this would affect the result aimed at by one ten-thousandth part of itself. Thirdly, the radius of motion of the centre of the upturned mouth of the siphon 28 is exactly equal to the basic radius OA of the water measuring wheel as shown in Figure 3.

In order that the balance arm 11 may move with perfect freedom, it is necessary that the lower part of the air bell 18 should not be pressed against the side of the mercury vessel 21 as the consequent friction would impede the movement of the air bell 18. In order to keep the air bell 18 centrally disposed in the mercury vessel 21, this carries a narrow internal ring or collar 63 of slightly larger diameter than the outside diameter of the air bell 18. In an alternative arrangement shown in Figure 7, the air bell itself is formed at its lower end with an annular flange 64 having a loose fit in the mercury vessel 21.

If the upturned mouth of the siphon 28 is left free, the water will rise to a convex surface above the level of its mouth as shown in Figure 4, but the surface of the water in the upper trough 32 and in the annexed trough 34 in which the siphon 28 dips will be even higher than the top of the convex surface shown in Figure 4 as there is a hydrostatic pressure in the water at this level owing to its high capillarity. When, however, a U-shaped strip of glass or metal, as shown at 30, is sprung on so as to grip the mouth of the siphon 28 on a diameter parallel to the axis, the wetted surface will drain away the water until its level is very closely that of the siphon mouth itself when the surface of the water will be substantially plane. As then there is no hydrostatic pressure due to capillarity, the water level in the troughs 32 and 34 will follow almost perfectly that of the centre line of the siphon mouth itself. The conditions without the strip 30 are shown in Figure 4 and the conditions with the strip 30 are shown in Figure 5, the dotted line 31 being the no pressure level in each case and, therefore, the level of the water in the troughs 32 and 34. It has been found by experiment that in one particular case the correcting strip 30 has the effect of lowering the level of the water by an amount equal to 0.145 inch, so that without it the levels would be that amount too high and the exact relationships required by the mathematical theory of the design would be vitiated to that extent.

The trough 32, into which the measuring wheel 10 dips, is provided with a long sloping ledge 33 at the back located so as to receive water from the lower water lifter carried by the shaft 6. The annexe trough 34 projecting in front of and communicating with the main trough 32 through a hole not shown, is provided so that the inlet leg of the siphon 28 may dip into quiet undisturbed water in the tank 34 which, of course, is at the same level as in the main trough 32 and the water dripping from the annexe trough 34 through the siphon 28 drops into the relatively large reservoir trough 36 below. The trough 32 is shown carried by lateral extensions of the back bar 29 of the framework and provided with locating stops as shown at 35. The reservoir trough 36 rests on the lowermost rods 49 of the framework. This trough holds enough water for continuous use for many months, or even for a year. The water doled out from the upper trough 32 for use in the calorimeter is returned into the reservoir trough 36 through the pipe 37 after passing through cooling coils. It is convenient to provide a clear glass plate, not shown in the drawings, in the main trough and standing up in front of the delivery mouth of the siphon 28, so that the latter may be visible, but nevertheless any accidental splashes of water may be returned to the main trough.

As mentioned above, water is fed into the upper trough 32 at a rate slightly in excess of that at which water is taken from it for the calorimeter by the measuring wheel 10. The device for lifting the water from the lower trough 36 is a simple rotary device having a number of thimbles 39 which are caused during the rotation to dip into the water in the trough 36 and to pour their contents as they are turned over during the course of rotation on to the sloping ledge 33 at the back of the trough 32. The thimbles 39, of which three are seen in Figure 1, are carried on arms 50 secured to the shaft 6 which is driven by the sprocket wheel 8 as already described. The size and number of the thimbles 39 and the gear ratio to the shaft 6 is such that they lift rather more water than the greatest quantity that the measuring wheel 10 will ever have to dole out.

In Figures 1 and 2, a simple trough 46 is shown to receive the water from the pitchers 44. With such an arrangement the flow through the calorimeter is intermittent or at least, it fluctuates regularly twice in each revolution of the measuring wheel 10. In this respect, it operates in a similar manner to the water weighing balance of the Boys recording calorimeter. When such a fluctuation is undesirable it may be reduced to a certain extent by making the receiving trough 46 much larger in area. The fluctuation can, however, be reduced to practically nothing by utilizing the principle of the isobath inkstand.

Figure 6:
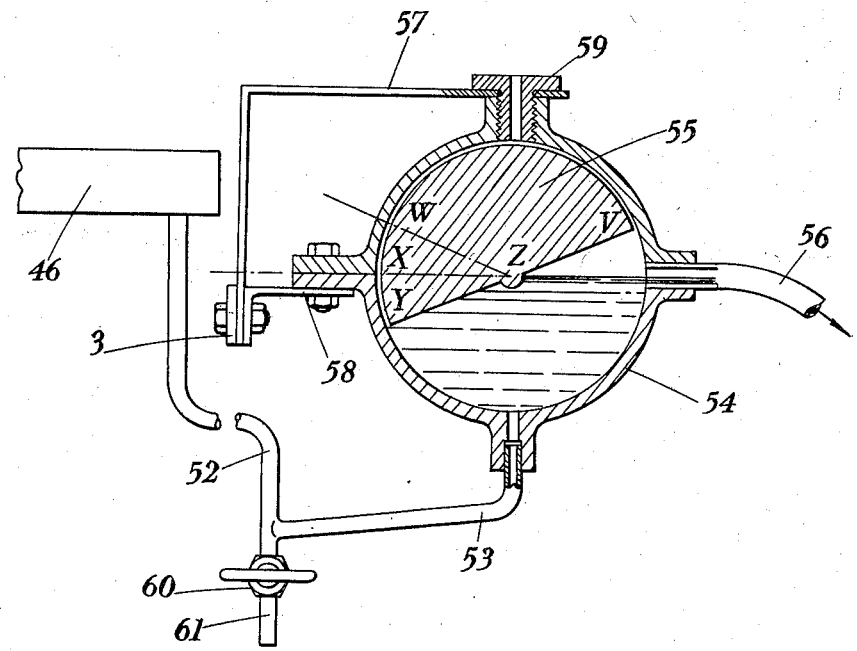
Figure 6 illustrates apparatus for eliminating fluctuations in the flow of water delivered by the apparatus.

The manner in which the principle of the isobath inkstand may be applied to the apparatus is illustrated in Figure 6 which shows the receiving trough 46 connected by pipes 52 and 53 with the bottom of a cylindrical container 54. A hemicylindrical float 55, the specific gravity of which is exactly half that of water, is mounted within the container 54 upon bearings at the water level which permit it to swing freely about the axis of the container. The float 55 serves always to keep the surface of the liquid in the container level with the horizontal diameter of the container. The reason for this is because, for the float to be in equilibrium, the moment of buoyancy of the submerged sector XYZ balances the moment of the weight of the sector WYZ (where the arc YX equals the arc XW), while the sector WZV is in equilibrium over the axis of the container. Water is continuously discharged from the surface of the water through a pipe 56 to the calorimeter. If more water is discharged from the container 54, in a given time, than is supplied through the pipe 56, the water level will not fall but the float will rotate in an anti-clockwise direction (as seen in Figure 6) and maintains the surface of the water at a constant height. Conversely if the container 54 receives more liquid, in a given time, than it delivers, the float 55 will rotate in a clockwise direction to keep the water surface at a constant height.

The container 54 is mounted on brackets 57 and 58 bolted to an extension of the back bar 3 corresponding to the extension 35 of the back bar 29 at the lower level. The space above the liquid in the container 54 is in communication with the atmosphere through a passage 59. A tap 60 in an extension 61 of the pipe 52 is provided for testing the action of the doling apparatus. When the tap 60 is opened the quantity of water picked up by each bucket can be measured by collecting the discharge through the pipe 61.

Instead of employing a cylindrical container, a spherical container may be employed. In this case the float is, of course, hemi-spherical.

The measuring wheel 10 as described and illustrated has elevating pitchers 44 and this has been found to be the preferable construction. The invention, however, is not limited to the provision of such pitchers as they may be omitted if the ends of the adjusting tubes 43 are extended as shown in Figure 8, the extended ends 65 being bent in towards the axis of rotation so as to deliver water to the trough 46.

It will be appreciated that the revolving unit of the water measuring device according to the invention is free from internal moving parts, and may revolve indefinitely without alteration or wear, and that the ball bearings on which they rotate are entirely enclosed and are therefore capable of running for years without attention, while the balance arm 11 with the long air bell 18 similarly is capable of almost indefinitely long service without attention. The instrument may, therefore, be used to dole out water of the precise and variable quantity required without any necessity for frequent attention; it might, in fact, be left unattended for a year and nevertheless it would continue to dole out water accurately. Further, the two water raising devices between them lift the water more than enough for the head of pressure to maintain the flow through the calorimeter and through the cooling coils and thus the instrument can be used to take the place of the pump as well as of the water balance hitherto used in conjunction with the Boys calorimeter. Furthermore, as the instrument compensates for the varying volume of the gas, it does the work of the so-called thinking machine (which is the subject of Patent No. 1,617,196) of the previous Boys calorimeter. On the other hand, the mathematical theory and the basis of the resulting design have required much working out and are not obvious even when the apparatus is seen in operation, yet the construction is eminently suitable for manufacture, for drawn tubes of standard sizes can be obtained, the smaller tubes 43 can be bent to an exact radius in a bending machine and the whole of the parts of each bucket system can be soldered together and to the spider frame 40 in a jig, so that extreme accuracy of construction is possible at low cost.

It has already been mentioned that the mathematical theory of operation depends upon the geometrical properties of two hyperbolas and as these have not been shown, it may be mentioned that the circle of curvature of the movement of the delivery mouth of the siphon 28 is the circle of curvature of the vertex of one hyperbola, and as the contact at this part of the curve is one of the third order, this circle is indistinguishable from the hyperbola over the range employed. Similarly, the radius of curvature of the adjusting tube 43, which is double the radius of curvature last mentioned, is the radius of curvature at its vertex of a hyperbola of double the size and therefore is similarly indistinguishable from it over the range employed.

I claim:—

1. An apparatus for doling out measured quantities of liquid, comprising in combination, at least one measuring receptacle including a main container and an adjusting tube in communication with said main container, a receiver for liquid, a reservoir for liquid located below said receiver, and driving means for rotating said receptacle about an axis so that it dips into said reservoir for picking up a measured quantity of liquid therefrom and then rises to a position for discharging the liquid into said receiver, said adjusting tube being arranged to adjust the exact amount of liquid picked up in accordance with the liquid level in said reservoir, within limits of variation of level, while said main container determines the main part of each amount of liquid picked up.

2. In apparatus for doling out measured quantities of liquid, a carrier adapted to be rotated about a horizontal axis and a tubular receptacle formed with an opening on each end, said receptacle being rigidly connected to said carrier and so shaped that when said carrier is rotated about said axis it can dip into liquid at a point below said axis so as to take in liquid through one of said openings and then, upon further rotation, discharge the whole of the liquid picked up from the other of said openings above said axis.

3. An apparatus for doling out measured quantities of liquid comprising in combination, a receiver for liquid, a reservoir for liquid located below said receiver, a carrier adapted to be rotated about a substantially horizontal axis and a measuring receptacle including a main container, a pitcher and an adjusting tube connecting said main container and said pitcher, said receptacle being fixed to said carrier and so formed and arranged that when said carrier is rotated it can dip into liquid within said reservoir, take in sufficient liquid, while within said reservoir, to fill said main container and part of said adjusting tube, carry the liquid upwards and discharge it through said pitcher into said receiver, said adjusting tube being arranged to adjust the exact amount of liquid picked up in accordance with the liquid level of said reservoir, within limits of variation of level.

4. An apparatus for doling out measured quantities of liquid, comprising in combination, at least one measuring receptacle, driving means for causing said receptacle to revolve round a horizontal axis, a reservoir for liquid, and means for controlling the level of liquid in said reservoir so that the level is caused to vary in accordance with a predetermined factor, said receptacle being operative to pick up at each revolution an amount of liquid which depends accurately on the liquid level in said reservoir, retain that liquid during further movement, and ultimately to discharge same.

5. An apparatus for doling out measured quantities of liquid comprising a rotary wheel, measuring tubes mounted on said wheel, a reservoir, means for rotating said wheel, said wheel and said reservoir being so relatively arranged that when said wheel is rotated said measuring tubes dip in succession into said reservoir so as to pick up a quantity of liquid at each revolution of the wheel, a siphon arranged with one mouth in said reservoir so as to control the liquid level therein, and means for moving said siphon automatically in accordance with a predetermined law, so that the liquid level in said reservoir varies in accordance with the said law and that the amount of liquid taken up by the wheel at each revolution also varies with the said law.

6. An apparatus for doling out measured quantities of liquid comprising in combination, a reservoir, a receiver, a rotatable member, means for rotating said carrier, a receptacle carried by said rotatable member, a siphon, a balanced arm carrying said siphon and means for causing said balanced arm to move in accordance with a predetermined factor, said wheel, receptacle and reservoir respectively being so arranged that when said wheel is rotated, it can dip into said reservoir, take up liquid therefrom and deliver it into said receiver, and said siphon being so located that one of its ends dips into said reservoir so as to control the liquid level therein and so arranged that the liquid level follows an inverse law with respect to the factor which the position of said balanced arm measures.

7. An apparatus for doling out measured quantities of liquid to a liquid flow gas calorimeter, comprising in combination, a rotatable carrier, a measuring receptacle fixed to said carrier, a reservoir for liquid, a conduit adapted to be connected to the gas calorimeter, means for controlling the liquid level in said reservoir, a mercury container, a bell for confining air above mercury in said container, means connecting said bell with said controlling means and arranged to vary the liquid level in said reservoir inversely in accordance with the volume of air in said bell and hence inversely in accordance with the gas volume factor of the moment, and means for supplying liquid to said reservoir, said carrier being operative to rotate in such a fashion that the said receptacle can pick up liquid from said reservoir, retain that liquid during further movement of said carrier and deliver it to said conduit and said receptacle being so formed and arranged that the amount of liquid picked up at each revolution depends accurately on the liquid level in said reservoir.

8. An apparatus for doling out measured quantities of liquid comprising in combination, at least one measuring receptacle, means including a motor for causing said receptacle to revolve round a horizontal axis, a receiver for liquid located above said axis, a reservoir for liquid located below said axis, means for supplying liquid to said reservoir, a siphon for controlling the level of liquid in said reservoir, means for adjusting automatically the position of said siphon in accordance with the atmospheric pressure and temperature of the moment so that the liquid level in said reservoir varies with such properties of the atmosphere, said receptacle being arranged so that when the arm is rotated it can dip into the reservoir, pick up a quantity of liquid depending upon the depth of liquid in said reservoir and deliver it into said receiver, and said means for feeding liquid to said reservoir being capable of adding more liquid to said reservoir than is picked up at each revolution by said receptacle so that said siphon discharges the excess of liquid from said reservoir.

9. An apparatus for doling out measured quantities of liquid comprising in combination, a rotatable carrier, a measuring receptacle fixed to said carrier, a reservoir for liquid, a receiver for liquid, a container for liquid, a conduit connecting said receiver and said container, a float mounted to turn about a horizontal axis within said container, said float being so constructed and formed that it has a specific gravity which is half the specific gravity of the liquid with which the apparatus is to be used and maintains the liquid level in said container at a constant height, said receptacle being arranged so that it can pick up at each revolution when said carrier is rotated a quantity of liquid depending accurately on the liquid level in said reservoir, retain that liquid during further movement and deliver it to said receiver so that said container receives a fluctuating supply of liquid and said container being formed with an outlet opening such that the liquid leaves said container at a substantially constant rate.

10. An apparatus for doling out measured quantities of liquid to a liquid-flow gas calorimeter, comprising in combination a rotatable carrier arranged to rotate about a horizontal axis, means for rotating said carrier about said axis, a measuring receptacle mounted on said carrier, a reservoir so located that said receptacle can, upon rotation of said carrier, dip into it and pick up liquid therefrom, a balanced arm pivoted about said axis, an inverted air bell mounted on one end of said arm, a mercury container arranged so that the open end of said air bell can dip into mercury in said container and a siphon carried by said arm on the side of said axis remote from said air bell and arranged to discharge liquid from said reservoir when the level thereof rises above one mouth of said siphon so that the liquid level depends upon the gas volume factor at the moment and the quantity of liquid picked up varies inversely as the gas volume factor.

11. An apparatus for doling out liquid in measured quantities to a liquid flow gas calorimeter comprising in combination a rotatable member, means for rotating said rotatable member, receptacles fixed to said rotatable member, a primary reservoir arranged so that when said rotatable member is rotated, said receptacles can dip in succession into said primary reservoir and pick up liquid therefrom, a secondary reservoir located below said primary reservoir, a water wheel adapted to raise liquid in a quantity which is always in excess of that picked up, in a given time, by said receptacle from said secondary reservoir to said primary reservoir, means for adjusting the level of liquid in said primary reservoir so that it varies inversely with the gas volume factor at the moment, means for rotating said water wheel, a delivery conduit adapted to be connected to a liquid flow gas calorimeter and a conduit adapted to return the liquid from said calorimeter to said secondary reservoir, said receptacles being arranged to pick up a quantity of liquid which depends accurately on the liquid level in said reservoir and discharge it into said delivery conduit.

12. In apparatus for doling out measured quantities of liquid to a liquid flow gas calorimeter, the combination of a carrier adapted to be rotated about a horizontal axis, a measuring receptacle fixed rigidly to said carrier and comprising a cylindrical container formed with a flute like opening at one end and a measuring tube fixed to the other end of the container, a reservoir for liquid, a receiver for liquid and means for automatically varying the liquid level in said reservoir inversely with the gas volume factor of the moment, said measuring receptacle being arranged so that said container and said adjusting tube lie in the same vertical plane and said adjusting tube being bent to a curvature having a radius that is double the distance between the axis of rotation of said carrier and said flute like opening, the centre of curvature lying on a line joining the centre of said adjusting tube with said axis of rotation and the distance between the centre of said adjusting tube and said axis of rotation being equal to and at right angles with the line joining said axis of rotation and said flute like opening, the arrangement being such that when said carrier rotates said measuring receptacle picks up liquid from said reservoir, raises it to a point such that the liquid is delivered through said adjusting tube to said receiver, said container serving to pick up the main bulk of liquid while said adjusting tube serves to adjust the amount of liquid picked up according to variations in the liquid level in said reservoir.

13. An apparatus for doling out measured quantities of liquid comprising in combination, a rotatable carrier, means for rotating said carrier, a receptacle fixed to said carrier, a reservoir for liquid, an annexe communicating with said reservoir, a receiver for liquid, a siphon having one limb extending into said annexe and the other limb formed with an upturned end lying outside said annexe and said reservoir, means for causing said siphon to rise or fall according to a predetermined law, means for delivering liquid to said reservoir, said receptacle being arranged to pick up a quantity of liquid depending upon the depth of liquid in said reservoir, when said carrier is rotated, and deliver the liquid picked up to said receiver while said siphon controls the level of liquid in said reservoir by discharging therefrom liquid that rises above its upturned end.

14. An apparatus according to claim 13, comprising a U-shaped strip fixed to the upturned end of said siphon for preventing the formation of a bulging meniscus above said upturned end.

CHARLES VERNON BOYS.